United States Patent [19]

MacKinnon

[11] Patent Number: 5,036,823
[45] Date of Patent: Aug. 6, 1991

[54] COMBINATION OVERFILL AND TILT SHUTOFF VALVE SYSTEM FOR VEHICLE FUEL TANK

[75] Inventor: Donald T. MacKinnon, Birmingham, Mich.

[73] Assignee: General Motors Corporation, Detroit, Mich.

[21] Appl. No.: 568,805

[22] Filed: Aug. 17, 1990

[51] Int. Cl.$^5$ .............................................. F02M 33/02
[52] U.S. Cl. ...................................... 123/520; 123/516; 220/85 VR
[58] Field of Search ............... 123/516, 518, 519, 520, 123/521; 137/43, 51, 154; 220/1 V, 85 F, 85 VR, 85 US, 86 R

[56] References Cited
U.S. PATENT DOCUMENTS

| | | | |
|---|---|---|---|
| 3,778,024 | 12/1973 | Rogerson | 123/520 |
| 4,756,328 | 7/1988 | Sherwood | 137/39 |
| 4,811,718 | 3/1989 | Sonoda | 123/516 |
| 4,815,436 | 3/1989 | Sasaki | 123/520 |
| 4,860,715 | 8/1989 | Hiraku | 123/519 |
| 4,872,439 | 10/1989 | Sonoda | 123/516 |
| 4,903,672 | 2/1990 | MacKinnon | 123/520 |
| 4,958,655 | 9/1990 | Danek | 123/516 |

Primary Examiner—Carl S. Miller
Attorney, Agent, or Firm—Patrick M. Griffin

[57] ABSTRACT

A vapor storage canister protection system that prevents tank overfill and prevents canister contamination when the vehicle tilts significantly from the horizontal, using a single valve to perform both the overfill and tilt protection shut off functions. A series of switches sensitive to when vehicle is being filled block the canister vent line at the end of fill, and then reopen after a short, timed duration or when the vehicle is restarted.

3 Claims, 3 Drawing Sheets

COMBINATION OVERFILL AND TILT SHUTOFF VALVE SYSTEM FOR VEHICLE FUEL TANK

This invention relates to vehicle fuel systems in general, and specifically to a means for preventing fuel tank overfill as well as prohibiting liquid fuel from escaping the tank and entering the canister vent line in the event of excessive vehicle tilting.

BACKGROUND OF THE INVENTION

Modern vehicle fuel systems generally include a vapor storage canister to collect vapors from the fuel tank. Typically, a vent line runs from a vapor pressure chamber located at the top of the fuel tank to the storage canister. If, during filling of the tank, liquid is allowed to rise high enough in the tank to enter the vent line, there is the possibility that liquid fuel could contaminate the adsorbent material in the vapor storage canister.

U.S. Pat. No. 4,756,328 to Sherwood, assigned to the assignee of the present invention, protects the canister vent line from liquid fuel in the event of tank overfill or excessive tank tilting through the use of a float ball valve system. This type of valve system prevents further entry of liquid fuel into the tank only after the tank has been filled nearly to the top. Also, the use of a float ball valve system has the potential drawback of the float ball being pushed upward into the closed position by the flow of the fuel vapor. Additionally, since the float ball is very light, gravity does not provide a great deal of force to pull it down off of the vent line opening. Hence, the stickier and more effective sealing surfaces of the vent line opening cannot be used without some additional mechanism to kick the lightweight float ball off of the vent line opening to reopen the valve.

It is known, in general, to construct a shutoff valve by supporting a weight with a spring below the canister vent line. When the vehicle is relatively level, the weight compresses the spring and leaves the vent line open. Should the vehicle tilt sufficiently, the spring can extend enough to push the weight up and close the vent line. A system that could actually prevent fuel tank overfill in the first instance, thereby eliminating the need for a float ball, but that also prohibited liquid fuel entry into the vent line in the event of tank tilting would avoid the potential problems associated with the float ball valve system mentioned above.

SUMMARY OF THE INVENTION

The invention comprises a valve system which prevents fuel tank overfill and also prohibits liquid fuel entry into the vent line in the event of excessive tilting, while avoiding the potential problems associated with the float-type valve design described above.

The invention is used in a vehicle that has an engine, a fuel tank adapted to be filled with liquid fuel, a vapor storage canister, and a vent line running from the canister and opening into the fuel tank. The vehicle also includes a sensor means that can detect when the fuel tank is being filled. The valve system includes a valve seat, also referred to as the vent line opening, that opens into the vent line. A magnetic weight, that is, a weight composed of a material that can be moved by a magnetic field, is located below the valve seat, supported by a compression coil spring.

Normally, the magnetic weight compresses the spring and rests beneath the valve seat in an open position, allowing the fuel vapors to freely exit the tank. However, as the vehicle tilts from horizontal, less weight is supported by the spring, and the spring elongates, forcing the magnetic weight up to a closed position, against the valve seat. As the vehicle returns to a more horizontal orientation, gravity pulls the magnetic weight back to its open position.

Furthermore, when the vehicle is being filled, the sensor means energizes an electromechanical means, which, in embodiment disclosed, is a solenoid. A magnetic field, created by solenoid, acts upon the magnetic weight to move it into sealing engagement with the valve seat. Once the filling process is over, the solenoid is deenergized to allow gravity to return the magnetic weight to its open position, or the direction of flow of current through the solenoid may be reversed to act upon the magnetic weight returning it to the open position.

It is, therefore, a general object of the invention to provide a vehicle fuel system with a combined overfill prevention and tilt shutoff valve system.

It is another object of the invention to provide a valve system of the type described that incorporates a fill actuated electromechanical means to independently close a gravity actuated tilt valve.

It is yet another object of the invention to provide a valve system of the type described that includes a spring supported magnetic weight, a solenoid that surrounds the magnetic weight, and a sensor means that determines when the vehicle fuel tank is being filled and then energizes the solenoid.

DESCRIPTION OF THE PREFERRED EMBODIMENT

These and other objects and features of the invention will appear from the following written description and from the drawings, in which.

Figure 1:
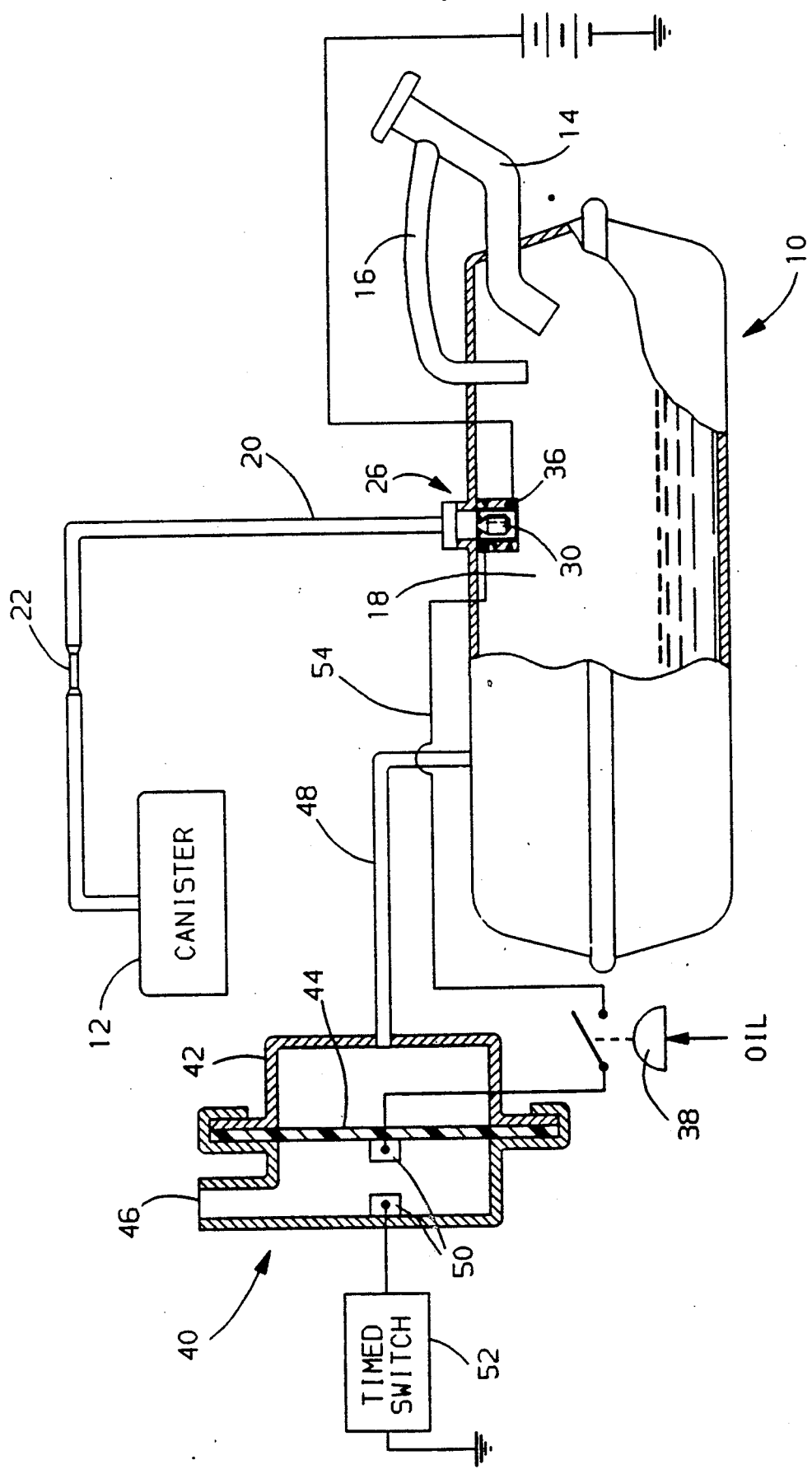
FIG. 1 is a schematic view of a vehicle fuel system incorporating the preferred embodiment of the invention when the vehicle is running and when the fuel level in the tank is less than completely full.

Referring to FIG. 1, the invention is incorporated in a vehicle fuel system that includes a fuel tank, indicated generally at 10, and a vapor storage canister 12. Tank 10 has a filler pipe 14 and a vent pipe 16 that runs from the interior of tank 10 to the top of filler pipe 14. The space above the level of the liquid fuel at the top of tank 10, indicated at 18, comprises a vapor pressure chamber for tank 10, which, in some tanks, might be a distinct interior structure. As tank 10 sits, chamber 18 would fill with a pressurized mixture of air and vaporized fuel, at a greater or lesser pressure depending on ambient temperature, fuel volatility, and other factors. These are generally referred to as diurnal vapors, which, if vented to atmosphere in order to keep their pressure from becoming too great, would be referred to as diurnal losses. These diurnal losses are prevented by providing a vent line 20 that runs through the top of tank 10, from pressure chamber 18 to canister 12. Canister 12 contains adsorbent material and is typically open to atmosphere at one end, so that as the air and vapor mixture passes through it, the fuel vapor is adsorbed and the air expelled. In order to not actually encourage the formation of tank vapors by providing too easy an exit, the vent line 20 is generally restricted, as at 22. In addition, since the restricted vent line 20 cannot release higher than normal pressures, tank 10 would likely include a conventional high pressure relief valve, not illustrated.

Figure 2:
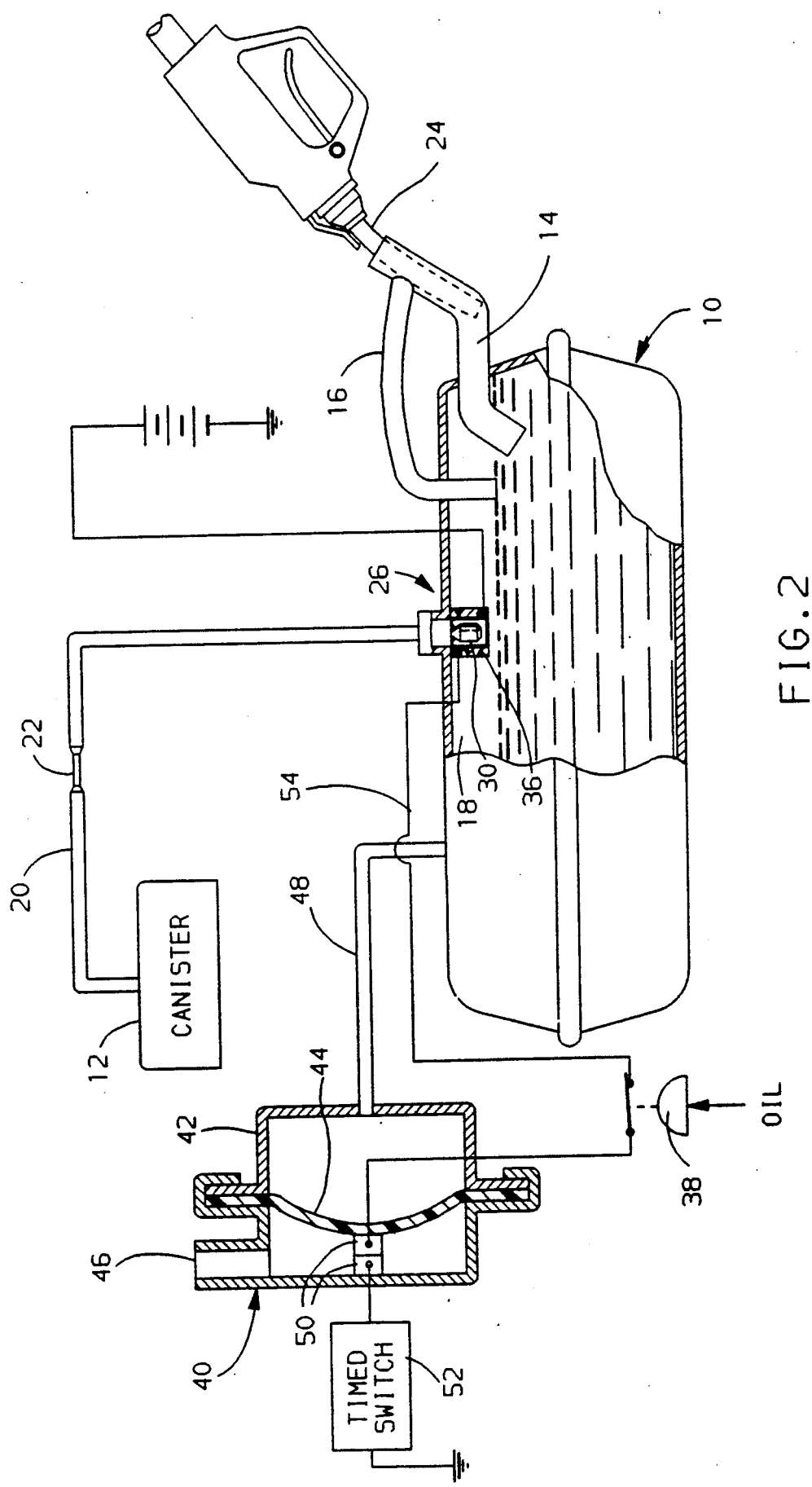
FIG. 2 is a view like FIG. 1, but with the vehicle not running, and with the tank just having been completely filled.

Referring next to FIG. 2, tank 10 would be filled by a conventional fuel nozzle 24 inserted in filler pipe 14. During fuel fill, a less restrictive outlet than vent line 20 is needed for the fuel vapors displaced to exit, as they would otherwise compress and pressurize chamber 18 and prevent rapid fill. Vent pipe 16 provides that ready outlet. When liquid fuel has risen high enough in tank 10 to block the end of vent pipe 16, as shown in FIG. 2, the easy exit ceases, and the full condition of tank 10 is defined. With the entrance of any more liquid fuel to tank 10, vapor pressure would begin to rise rapidly in chamber 18, backing liquid fuel quickly up filler pipe 14 to automatically shut off nozzle 24. The operator, however, may try to ease more fuel into tank 10. If added slowly enough, the vent line 20, even though restricted, could provide enough vapor exit to allow the addition of the extra fuel. If liquid fuel reached vent line 20, it could potentially reach and contaminate canister 12. Contamination of canister 12 could also occur due to liquid fuel reaching vent line 20 if tank 10 tilted excessively from horizontal. A conventional buoyant float located inside tank 10 below the opening of vent line 20 could be provided to act as a shut off, but it would would only after fuel had risen nearly to the top of tank 10, high enough to buoy up the float.

Figure 3:
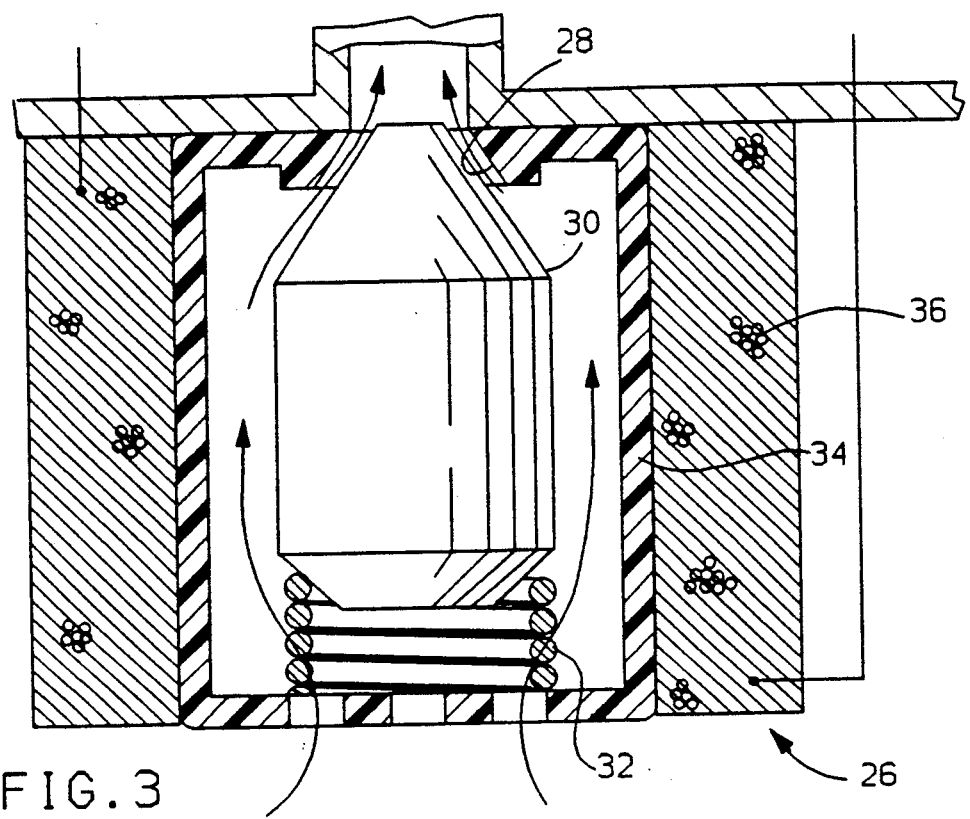
FIG. 3 is a cross-sectional view of the valve when the fuel tank is not significantly tilted from the horizontal.

Referring to FIGS. 1 and 3, the invention provides a protection scheme against fuel overfill contamination of canister 12 that prevents tank 10 from being overfilled in the first place. It also utilizes only one valve, indicated generally at 26, to perform both the overfill and tilt protection shut off functions, and obviates the use of a conventional float. Vent line 20 is interrupted by valve 26 at a location below restriction 22. Valve 26 has a valve seat 28, also referred to as the vent line opening, that opens into vent line 20. Valve seat 28 is an conical, tapered surface whose narrower diameter enters into vent line 20 and whose wider diameter faces downward toward tank 10. Valve 26 has a magnetic weight 30 which is steel, or some other material capable of being moved by a magnetic field. The lower end of magnetic weight 30 is supported by a spring 32 aligned with and below valve seat 28. Valve seat 28, magnetic weight 30, and spring 32 are contained within a valve housing 34. When magnetic weight 30 is substantially vertical and aligned with spring 32, as it normally is, spring 32 is compressed, and the tapered end of magnetic weight 30 rests below valve seat 28, and valve 26 is open.

Figure 4:
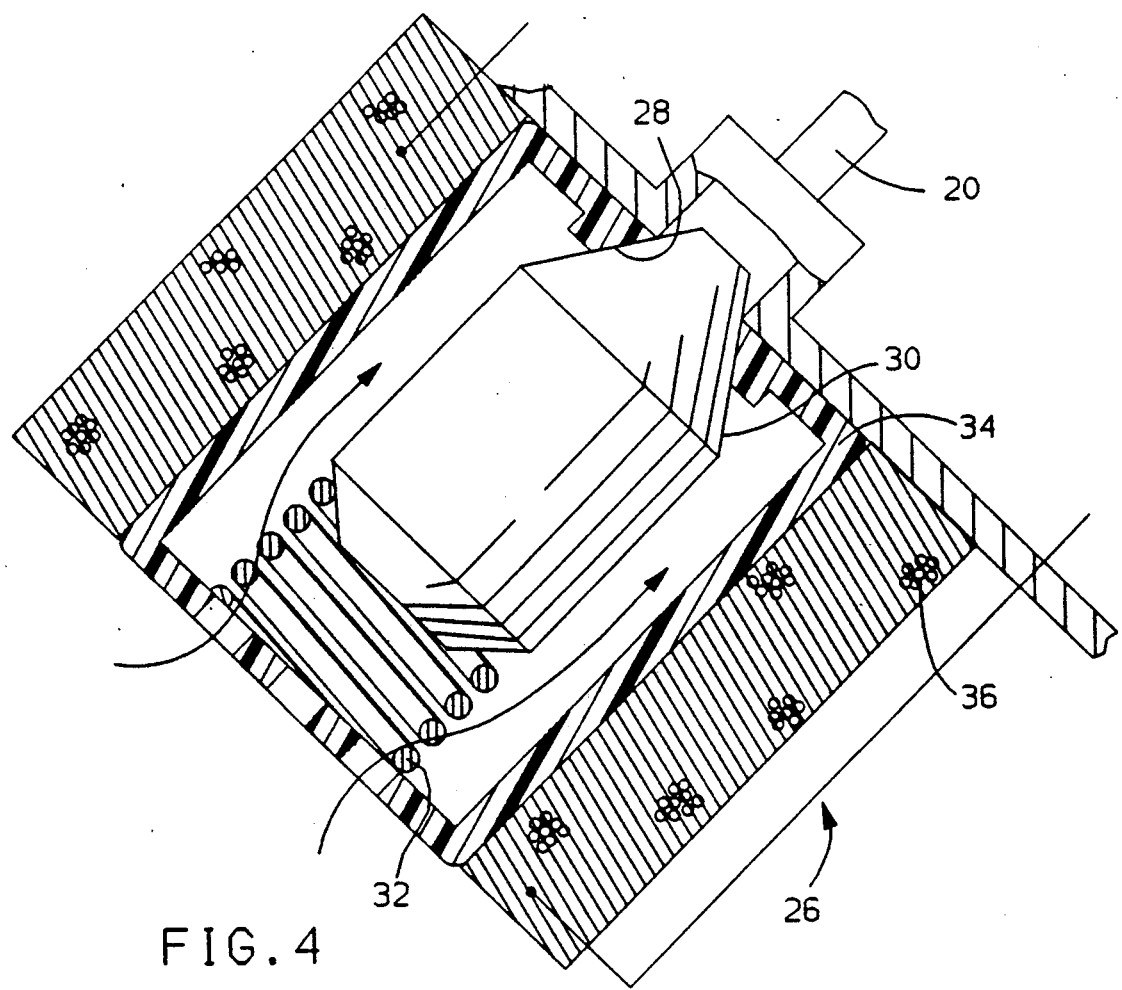
FIG. 4 is a view like FIG. 3, but showing the fuel tank tilted to the point where the valve is closed.

Referring next to FIG. 4, when the orientation of valve 26 moves away from horizontal, as when tank 10 tilts, less weight of magnetic weight 30 is acting in the axial direction of spring 32. Since less weight of magnetic weight 30 is being supported b spring 32, spring 32 is able to extend, moving magnetic weight 30 into engagement with valve seat 28, thereby closing valve 26. When the orientation of valve 26 moves back to horizontal, the full weight of magnetic weight 30 bears upon spring 32 causing spring 32 to again compress, opening valve 26.

Referring next to FIGS. 1 and 2, an electromechanical means is provided that can lift weight 30 to the closed position independently of gravity. As disclosed, the electromechanical means is a solenoid 36. Solenoid 36 surrounds valve housing 34 and magnetic weight 30 so that it can, if energized, induce a magnetic field that will lift magnetic weight 30, closing valve 26. Valve 26 may be opened by deenergizing solenoid 36, thus allowing only gravity to act on magnetic weight 30.

A sensor means is provided that energizes solenoid 36 when, and only when, tank 10 is being filled. As disclosed, the sensor means includes a series of three electrical switches that are interconnected so as to energize or deenergize solenoid 36 in response to whether the vehicle is running or not, in response to tank pressure rising to a threshold level, and in response to elapsed time. The switch that responds to whether the vehicle is running is indicated at 38. As disclosed, the vehicle switch 38 is an oil pressure activated switch, which could be connected to a convenient oil line, and which is open only when it sees oil pressure, and closed when the vehicle is not running. The tank pressure switch, indicated generally at 40, includes a containment 42 divided by a diaphragm 44, open to atmosphere on one side by a vent 46 and open on the other side to tank pressure through a pressure line 48. A set of electrical contacts 50 on the diaphragm 44 engage only when diaphragm 44 is bulged to the left. The threshold pressure differential that would activate tank pressure switch 40 would be set to be slightly greater than the pressure that would be normally generated by diurnal vapors, though less than the pressure that would be expected in chamber 18 at the end of fill, and less than the above normal tank pressure that would open any high pressure relief valve in the system. The switch that responds to elapsed time, indicated diagramatically at 52, is the type that stays closed for only a predetermined time interval after being energized, then automatically opens. That time interval would be set to be longer than a typical operator would be likely to try to squeeze in more fuel at the end of fill, and would likely be approximately six to ten minutes. A connecting circuit indicated generally at 54 connects all three switches 38, 40 and 52 in series.

Comparing FIGS. 1 and 2, if the vehicle is running, at least the vehicle switch 38 will be open, so that connecting circuit 54 remains uncompleted and solenoid 36 cannot energize. Valve 26 remains open, as does vent line 20. Should pressure build in vapor pressure chamber 18 for any reason, diaphragm 44 could bulge to the left, engaging the contacts 50, but, again, no circuit would be completed, since vehicle switch 38 would be open. If the vehicle is not running, vehicle switch 38 will remain closed, giving the potential for connecting circuit 54 to be completed. If the pressure in chamber 18 should rise higher than the normal diurnal vapor pressure threshold for any reason, which would bulge diaphragm 44 to the left and engage the contacts 50, then timed switch 52 would be energized, completing connecting circuit 54, and energizing solenoid 36 to close valve 26. If the tank pressure rose while tank 10 was closed, as in FIG. 1, then the closing of valve 26 would be essentially irrelevant. If conditions were right, the pressure in tank 10 might continue to rise to the point where the tank high pressure relief valve would open. This would lower tank pressure quickly, and reopen tank pressure switch 40 to break connecting circuit 54 and reopen valve 26. In any event, timed switch 52 would reopen soon, anyway. The pressure might also rise during fuel fill, as illustrated in FIG. 2. That would also close tank pressure switch 40 and valve 26. Then, no more fuel can be pumped in so long as timed switch 52 is closed, which will be longer than a reasonable operator would be likely to try. After fill is completed, connecting circuit 54 will be broken, and valve 26 reopened, either by the vehicle starting to open vehicle switch 38, or by the timed switch 52 automatically opening.

Variations of the preferred embodiment could be made. The invention could incorporate any one of several designs for the gravity-actuated tilt shutoff feature of the valve system, so long is had a movable magnetic weight. Another possibility would be to make solenoid 36 bi-directional. Once solenoid 36 had been energized to close valve 26, valve 26 could be opened by reversing the direction of the electrical current through solenoid 36. This would induce a positive pull on magnetic weight 30 in addition to gravity which would ensure that valve 26 will not stick in the open position. Note that if this alternate design were chosen, solenoid 36 would be energized in the reverse direction for only a timed duration long enough to reopen valve 26 so as not to interfere with the tilt protection function of the valve. Also, other electromechanical devices that provided a magnetic field in response to energization could be used to block valve 26, although a solenoid 36 would be the most likely choice. Also, alternate sensor means can be employed to sense whether tank 10 is being filled. Such sensor means can include monitoring the weight of tank 10, or monitoring the level of liquid fuel in tank 10. Therefore, it will be understood that the invention is not intended to be limited to the exact embodiment disclosed.

The embodiments of the invention in which an exclusive property or privilege is claimed are defined as follows:

1. In a vehicle that has an engine, a fuel tank adapted to be filled with liquid fuel, a vapor storage canister, and a vent line running from said canister and opening into said fuel tank, a combined overfill and shutoff valve system, comprising,
   a valve including a magnetic weight supported beneath said vent line opening so as to be movable upwardly, under the force of gravity, from a normally open position to a closed position shutting off said vent line when said vehicle tilts sufficiently from horizontal,
   electromechanical means adapted to lift said magnetic weight, when energized, from said open to said closed position independently of gravity, and,
   sensor means adapted to energize said electromechanical means only when said fuel tank is being filled,
   whereby, said blocking valve serves to shut off said vent line both when said vehicle tilts sufficiently and when said fuel tank is being filled.

2. In a vehicle that has an engine, a fuel tank adapted to be filled with liquid fuel, a vapor storage canister, a vent line running from said canister and opening into said fuel tank, and a sensor means adapted to be activated only when said fuel tank is being filled, the improvement which comprises,
   a valve including a magnetic weight supported beneath said vent line opening so as to be movable upwardly, under the force of gravity, from a normally open position to a closed position shutting off said vent line when said vehicle tilts sufficiently from horizontal,
   an electromechanical means adapted to lift said magnetic weight, when said sensor means is activated, from said open to said closed position independent of gravity,
   whereby said valve performs the dual, independent functions of preventing liquid fuel from entering said vent line when said fuel tank is being filled and also when said vehicle tilts sufficiently from horizontal.

3. In a vehicle that produces oil pressure only when running, and that has a fuel tank, a vapor storage canister, and a vent line running from said canister and opening into a vapor pressure chamber at the top of said fuel tank, a combined overfill and shutoff valve system comprising,
   a valve including an elongated magnetic weight supported on a spring aligned with and beneath said vent line opening, so as to be movable upwardly, under the force of gravity, from a normally open position to a closed position shutting off said vent line when said vehicle tilts sufficiently from horizontal,
   a solenoid capable of lifting said magnetic weight, when energized, from said open to said closed position independently of gravity,
   an oil pressure activated electrical switch that is open only when said vehicle is running,
   a tank pressure activated electrical switch that moves from an open to a closed position when the pressure in said vapor pressure chamber rises above a predetermined threshold value,
   a timed electrical switch that is set to stay closed and pass current for only a predetermined time after it is first energized, then to automatically open and interrupt any circuit of which it is a part, and,
   a connecting circuit joining all of said switches in a series, so that current reaches said solenoid only when all three of said switches are closed,
   whereby, when said vehicle is horizontally oriented, said magnetic weight is substantially vertically oriented and compresses said spring sufficiently but when said vehicle is oriented sufficiently away from horizontal, said magnetic weight moves away from vertical, so that less weight of said magnetic weight is supported by said spring, allowing said spring to extend and move said magnetic weight and to close said valve; additionally, when said vehicle is not running and said tank is being filled, said oil pressure switch will be closed, so that when said fuel level rises to the point that the pressure in said vapor pressure chamber rises above said threshold value, said tank pressure switch will close as well, thereby energizing said timed switch and energizing said solenoid to lift said magnetic weight to close said valve.

* * * * *